Oct. 16, 1962     D. MEKLER     3,058,214
HYDRAULICALLY OPERATABLE HAND TOOL
Original Filed Nov. 20, 1959     5 Sheets-Sheet 1
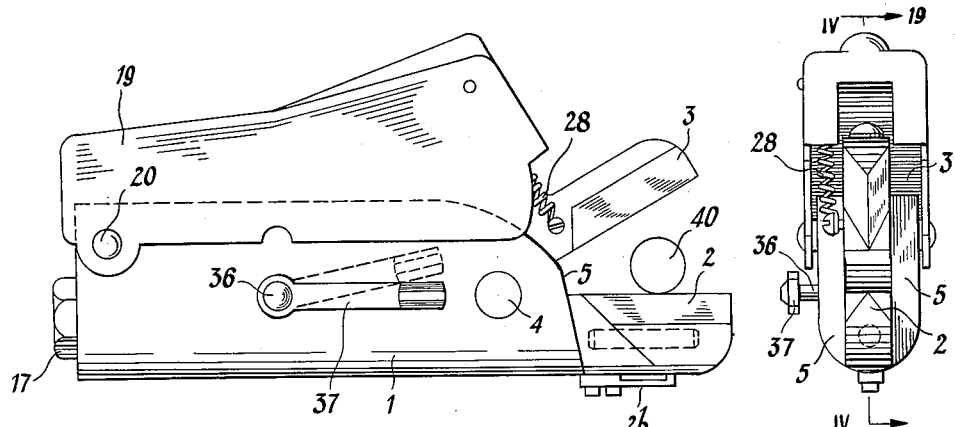
Fig.1
Fig.2
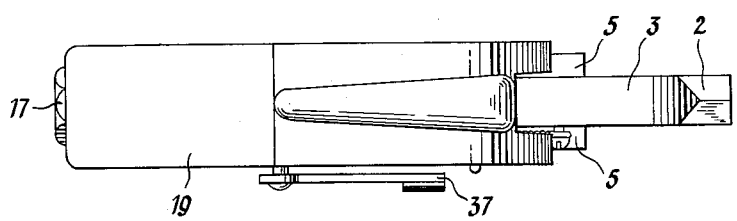
Fig.3
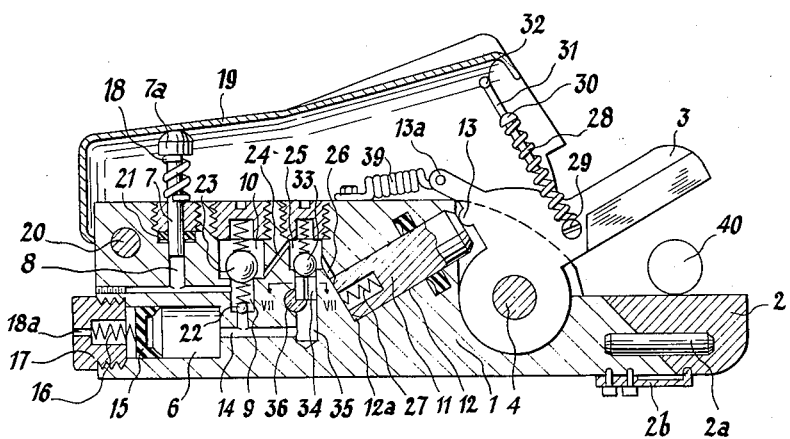
Fig.4
INVENTOR.
DAN MEKLER
BY Wallenstein & Spangenberg
attys.

INVENTOR.
DAN MEKLER

Oct. 16, 1962 D. MEKLER 3,058,214
HYDRAULICALLY OPERATABLE HAND TOOL
Original Filed Nov. 20, 1959 5 Sheets-Sheet 3

INVENTOR.
DAN MEKLER
BY
Wallenstein & Spangenberg
attys.

Oct. 16, 1962   D. MEKLER   3,058,214
HYDRAULICALLY OPERATABLE HAND TOOL
Original Filed Nov. 20, 1959   5 Sheets-Sheet 4
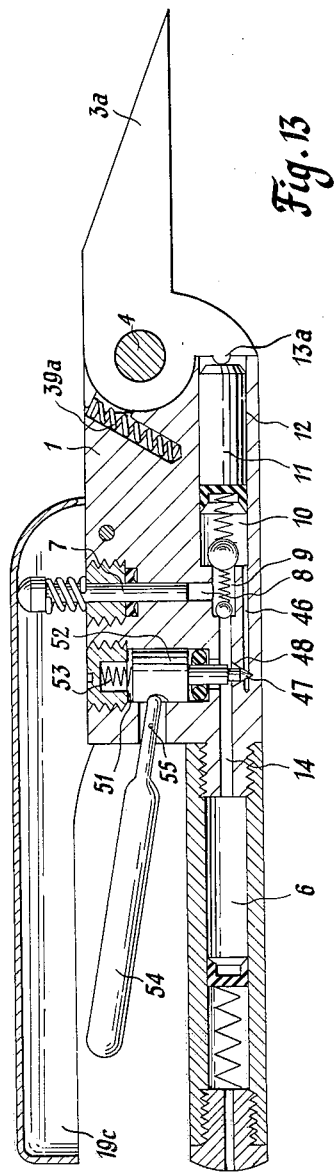
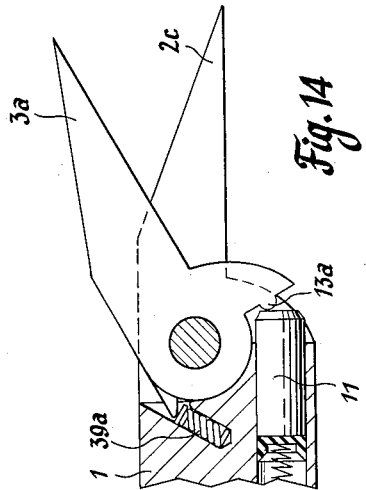
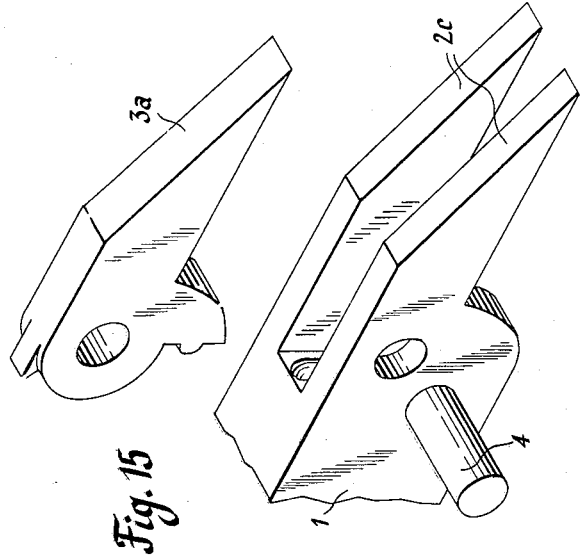
INVENTOR.
DAN MEKLER
BY
Wallenstein & Spangenberg
Attys Oct. 16, 1962 D. MEKLER 3,058,214
HYDRAULICALLY OPERATABLE HAND TOOL
Original Filed Nov. 20, 1959 5 Sheets-Sheet 5
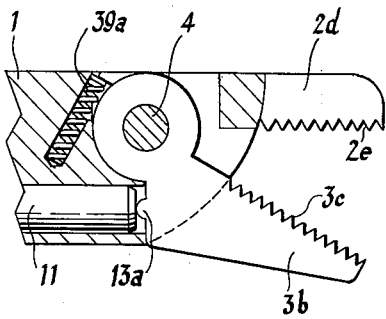
Fig.16
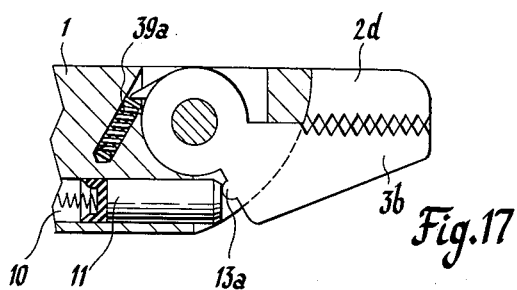
Fig.17
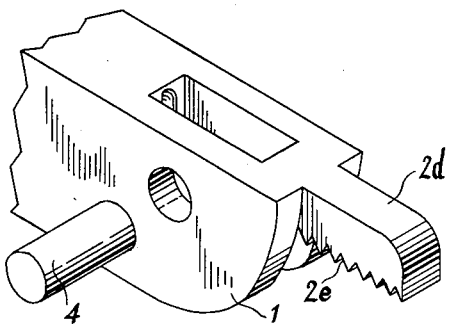
Fig.18
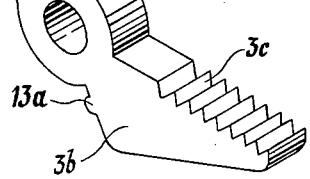
INVENTOR.
DAN MEKLER
BY United States Patent Office 3,058,214
Patented Oct. 16, 1962

3,058,214
HYDRAULICALLY OPERATABLE HAND TOOL
Dan Mekler, 47 Jaffa St., % Glaser, Jerusalem, Israel
Continuation of application Ser. No. 854,487, Nov. 20, 1959. This application Dec. 12, 1961, Ser. No. 160,400
10 Claims. (Cl. 30—180)

The invention relates to a hydraulically operated hand tool adapted to be held and operated with one hand which comprises a fixed jaw and a movable jaw and which can be used for different purposes according to the design of the jaws, e.g. as a wrench, a pipe wrench, a hand vise, a cutter, an outward grip pliers, and with the aid of which high pressure can be brought to bear on the work between the jaws with a small force exerted in the operation of the tool. A further object of the invention is to provide a tool of the kind referred to which is self-locking, whereby pressure on the work is maintained when the operator releases the tool temporarily.

The invention is more particularly concerned with hydraulic tools of the kind in which the stationary jaw is secured to a frame or housing member and which comprise a handle swingably movable in relation to the frame or housing, as contrasted, for example, to monkey wrenches.

In some known wrenches of the kind to which the invention relates, power is transmitted from the handle to the movable jaw by a lever system. The mechanical advantage produced by the latter is limited by the necessity to keep the dimensions of the tool small enough for one-hand operation. Where great pressure on the work is required, e.g. with cutting tools, the dimensions of one-hand operation are usually exceeded and the tool has to be designed for operation by both hands. It has also been suggested to connect the handle with the movable jaw by a toggle joint. These wrenches can produce considerable gripping power in the dead-center position of the toggle joint, but the power tapers off steeply when the handle has passed through the dead-center position of the toggle joint. For this reason these tools cannot be designed as cutters, for in a cutter the pressure on the work must not fall off until the operation has been completed, and analogous considerations apply to outward grip pliers.

It has also been suggested to provide hand tools with means for hydraulic actuation. Known tools of this kind are of complicated design and limited applicability and require operation of the hydraulic system even in idling movement. Moreover, in all cases where they are designed for one hand operation they are restricted to such operations in which the movable jaw is moved in a vise-like manner along a straight path towards and away from the fixed jaw. Their use is, therefore, very limited.

The invention has the object to provide a hydraulically operated hand tool which can be designed for application for a variety of different purposes according to the kind of head with which it is fitted, either permanently or exchangeable.

According to the present invention there is provided a one-hand hydraulic tool comprising a frame and a stationary jaw fixed thereto; a movable jaw pivotally mounted in the frame for movement towards and away from the stationary jaw and including a cam member; a hydraulic power system disposed in the frame and including a liquid tank, a piston reciprocable in a cylinder and adapted to be hydraulically pressed unconnectedly against the cam member of the movable jaw, thereby to impart a moment to the movable jaw, first spring means for continuously biassing the piston against the cam member a pump connected to the tank by a suction duct and to the cylinder by a delivery duct, check valves in the suction and delivery ducts, a return duct from the cylinder to the tank, and a pressure release valve in the return duct; a handle connected to the frame member for the operation of the pump; and second spring means acting on the movable jaw in opposition to the moment imparted to the movable jaw by the pressure exerted on said cam member by the hydraulic piston.

Means may be provided for mechanically shifting the movable jaw into contact with the work at the beginning of the operation with or without simultaneous operation of the hydraulic pump, whereby time and labor is saved as the operation of the hydraulic system is not wasted for the idle motion of the movable jaw.

The invention is illustrated, by way of example only, in the accompanying drawings in which:

FIGS. 1, 2 and 3 are a side elevation, front elevation and top plan view, respectively, of a hydraulic hand-tool according to the invention, designed as a cutter, in the open state ready for operation;

FIG. 4 is a section thereof on line IV—IV of FIG. 2;

FIG. 13 is a median longitudinal section of another hydraulic tool according to the invention, designed as an outward grip pliers;

FIG. 14 is a side view of the jaws or bits of the tool according to FIG. 13 in the spread or operational state;

FIG. 15 is an exploded fragmentary perspective view of the jaws or bits of the tool according to FIGS. 13 and 14;

FIGS. 16 and 17 are fragmentary median longitudinal sections of the bit portion of a tool designed as a wrench;

FIG. 18 is a fragmentary exploded perspective view of the bits according to FIGS. 16 and 17.

Figure 5:
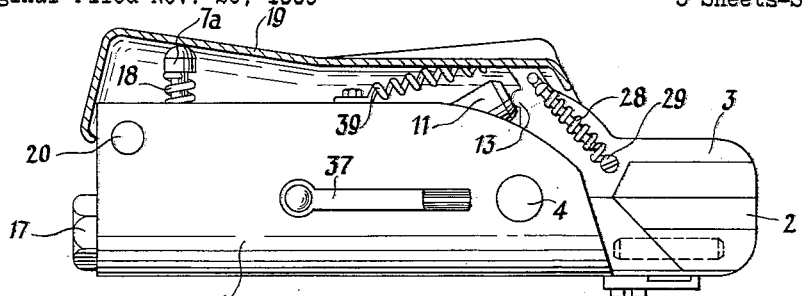
FIG. 5 is a side elevation, partly in longitudinal section, of the same tool in the closed state.
Figure 6:
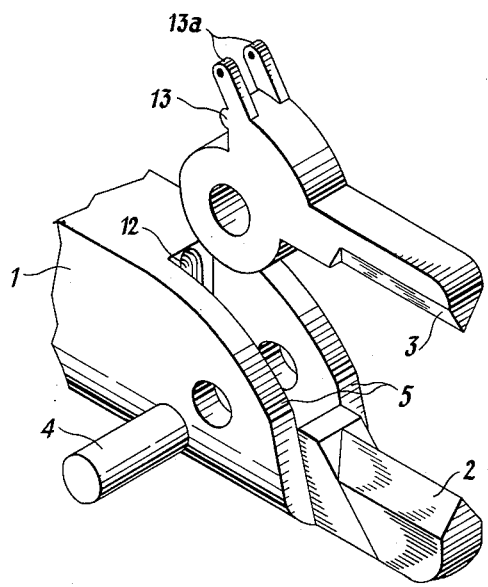
FIG. 6 is an exploded fragmentary perspective view, on an enlarged scale, of the front part of the tool.
Figure 7:
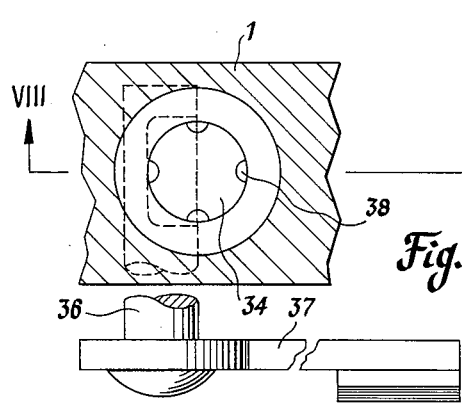
FIG. 7 is a detail, showing the release valve in fragmentary section on line VII—VII of FIG. 4 on an enlarged scale.
Figure 8:
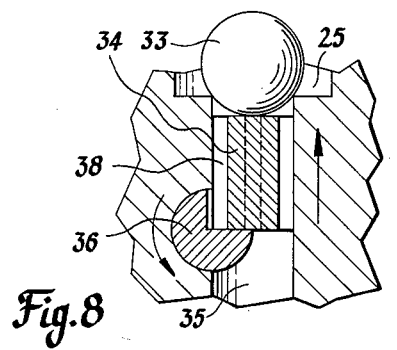
FIG. 8 is a section on line VIII—VIII of FIG. 7.

The tool illustrated in FIGS. 1 to 8 comprises a block-shaped frame or housing 1. A jaw 2 is rigidly secured to the frame and the companion jaw 3 is turnable about a pivot pin 4 between brackets 5 (FIG. 6) which are extensions of the frame 1. In the example here shown the jaws are designed as cutting bits. According to the intended use of the tool, e.g. as a plier, wrench, pipe wrench or the like, the jaws may have any other design. In the tool here illustrated by way of example, the jaws are exchangeable for replacement when they are worn, or for substitution by different jaws whereby the same tool can be adapted to different purposes. The jaw 3 can be removed by extraction of the pin 4. The jaw 2 is connected to the frame 1 by means of a dowel-pin 2a (FIG. 4), and secured in its position by a locking tongue 2b secured to the frame 1 and having a tooth engaging a corresponding recess in the jaw 2.

The frame 1 accommodates the hydraulic power system of the tool. This includes a tank 6, a pin-shaped piston 7 reciprocable in a cylindrical bore 8 and having a head 7a at the end projecting from the bore, a suction chamber 9, a delivery chamber 10 and a piston 11 reciprocable in a cylindrical bore 12 (FIG. 4). The front end of the piston 11 bears against a nose-like cam member 13 of the movable jaw 3, against which it is biassed by a compression spring 27 accommodated in a recess in the bottom of the piston and bearing against the bottom of the cylinder 12.

The tank 6 opens into a discharge duct 14 which is connected to the suction chamber 9. The outer end of the tank opposite the discharge duct is closed tightly by a piston 15, e.g. a leather cup, which is biassed inwards by a compression spring 16 inserted between the outer face of the cup 15 and a plug 17 screwed to the tank 6. The plug has a vent 18a through which the space between the plug and cup is kept in communication with the atmosphere for the maintenance of atmospheric pressure in that space. The cup 15 is thus always urged inwards and tends to expel hydraulic liquid from the tank into the delivery duct 14.

The head 7a of the pin 7 is biassed into contact with a cover 19 by a compression spring 18 coiled on the part of the pin projecting out of the cylinder 8. This cover has U-shaped profile; it is hinged to the rear end of the frame 1 by a pin 20 and serves as the operating handle of the tool. Its side walls overhang the flanks of the frame 1 and are guided along the latter. When the handle is pressed towards the frame 1, the pin 7 is forced further down into the cylinder 8, and when the handle 19 is released, the pin 7 follows outwards under the action of the spring 18. The pin 7 passes tightly through a gland 21 screwed into a corresponding socket in the frame 1. The connection between the delivery duct 14 and the suction chamber 9 is controlled by a spring-loaded check valve 22. This is a ball valve in the example shown, but it may have any other suitable design. The passage between the suction chamber 9 and delivery chamber 10 is controlled by a spring-loaded check valve 23.

Chamber 10 communicates through a duct 24 with the auto-chamber 25 of a pressure release valve, and chamber 25 communicates through a duct 26 with an annular space 12a in the bottom part of cylinder 12 formed by a bevel shoulder round the rear face of the piston 11.

The handle 19 is connected to the upper jaw 3 by links which include a helical compression spring 28 articulated at 29 to the upper jaw 3 and merging at its opposite end into a head 30. The latter has a central hole in which a rod 31 pivoted at 32 to the handle 19 is slidable.

The pressure release valve includes a check valve 33, e.g. a spring-loaded ball, accommodated in the chamber 25, and a push rod 34 slidable in a duct 35 and adapted to be pushed by an operating member 36 against the ball 33 in order to lift it from its seat. The operating member 36 (FIGS. 7 and 8) is a round bar which is turnable in a cylindrical seat in the frame 1. It has a notch in which the rod 34 rests unconnectedly, and a handle 37 is fixed to the bar 36. The rod 34 has flutings 38 through which the liquid can flow from chamber 25 into the duct 35 when the valve 33 is opened.

Lugs 13a made in one piece with the jaw 3 are connected to the frame 1 by tension springs 39 whose action is opposed to the hydraulic pressure and the action of springs 27 on the piston 11.

The operation of this tool is as follows:

In the inoperative state shown in FIGS. 1, 2 and 4, the springs 39 hold the movable jaw 3 in its most retracted position away from the jaw 2, whereby the piston 11 is pushed back into its most retracted position against the action of spring 27; piston 7 is held in its outermost position by the action of spring 18, and the check valves 22 and 23 are closed. The bulk of the hydraulic liquid has collected in the tank 6, and the cup 15 has been shifted into its outermost position by the hydraulic liquid under the action of spring 39 on the piston 11, and against the action of spring 16. Therefore, in the inoperative state, the springs 39 have to counteract springs 27 and 16 and must be dimensioned accordingly.

For operation, e.g. for cutting a round bar 40 placed on the fixed jaw 2, the operator presses the handle 19 towards the frame whereby the rod 31 is pushed into the spring 28. When the top wall of handle 19 comes to bear against the head 30 of the spring, the movable jaw 3 is turned clockwise until it makes contact with the bar 40. As a result of this movement of the movable jaw 3, the cam member 13 pivots in a clockwise direction and as a result the piston 11 is forwardly displaced in the cylinder 12 under the influence of the compression spring 27, there being thereby brought about a lowering of pressure in the ante-chamber 25 as a result of which the check valve 33 opens under the pressure of hydraulic liquid in the duct 14 and the liquid flows into the cylinder 12. At the same time the downward stroke of the piston 7 forces liquid into the suction chamber 9 so as to displace the valve 23 and allow the flow of the liquid through the delivery chamber 10, the duct 24, the ante-chamber 25, the duct 26, into the cylinder 12. At the end of the stroke of the piston 7 the check valves 23 and 33 close and the liquid can no longer flow back from the cylinder 12. When the piston 7 moves upwardly, then, as a result of the lowering of the pressure which arises in the suction chamber 9, the valve 22 is opened as is the valve 23 and, as a result, liquid flows from the tank 6 through the suction and delivery chambers 9 and 10, the duct 24, the ante-chamber 25, the duct 26, to the cylinder 12. Upon the subsequent downward stroke of the piston 7, this liquid forces the piston 11 further to displace the movable jaw 3. As the handle is repeatedly pressed and released the piston is hydraulically pushed forward and makes the movable jaw further close in on the fixed jaw and cut the bar 40. In the result, great power is obtained between the jaws by a large number of strokes of the handle, each of which requires but little force. Working pressures of one ton and above can easily be produced by means of hand tools of very moderate dimensions, e.g. of a length of 15–20 cms., which are not heavy and can readily be operated with one hand.

It should be understood that the provision of the spring 27 which biasses the piston 11 against the cam member 13 allows for the rapid displacement of the movable jaw into contact with the bar 40 without the necessity of repeated pressing and release of the handle. Thus the function of the spring 27 is two-fold, firstly to ensure that the piston 11 follows the movements of the cam member 13 and secondly by causing the displacement of the piston 11 upon rotation of the cam member 13, effecting the reduction of pressure in the ante-chamber 25 with the results referred to above.

When the jaws are to be opened, e.g. after the termination of a cutting operation, the operating member 36 of the pressure release valve is turned whereby the valve 33 is lifted from its seat. Springs 39 then push the piston 11 back against the action of spring 27, whereby the hydraulic liquid is expelled from the cylinder 12 through chamber 25 and ducts 35 and 14 back into the tank 6. The relief valve is then closed again, and the tool is ready for another operation.

Figure 9:
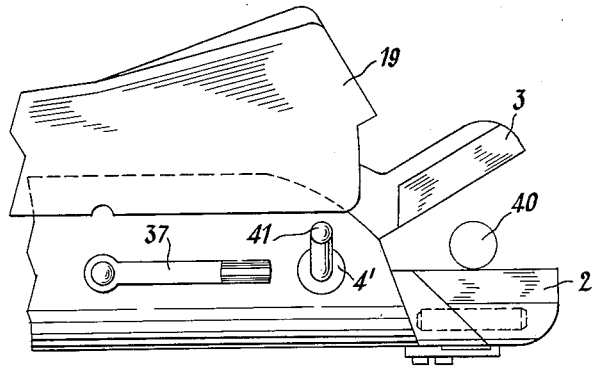
FIG. 9 is a fragmentary side elevation of a cutter according to a second embodiment of the invention.
Figure 10:
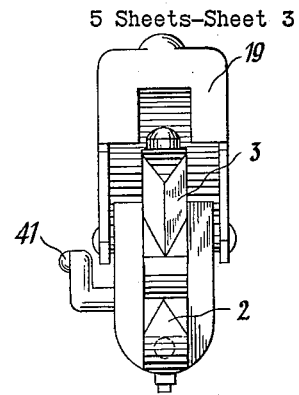
FIG. 10 is a corresponding front elevation.

In the tool according to FIGS. 9 and 10, the links connected between the handle and movable jaw have been replaced by a handle 41 fixed to the axle 4' on which the movable jaw 3 is fixedly mounted. By the actuation of the handle 41 the movable jaw can be turned towards the fixed jaw at the beginning of the cutting operation until it contacts the bar 40 to be cut.

Figure 11:
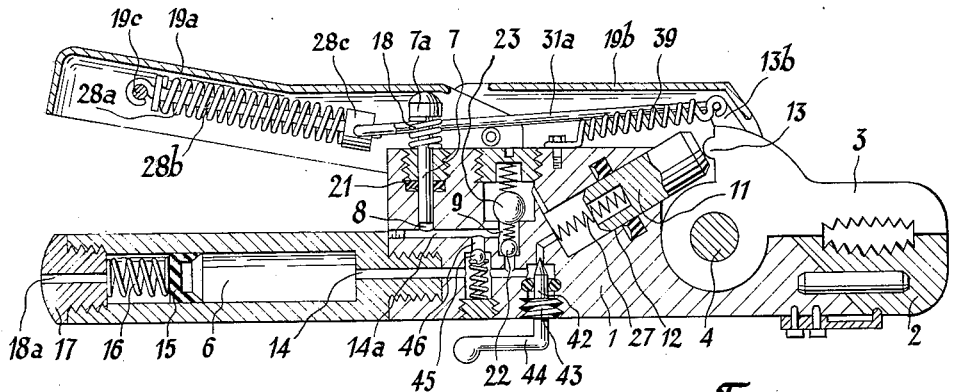
FIG. 11 is a longitudinal section of a pipe wrench according to a third embodiment of the invention.
Figure 12:
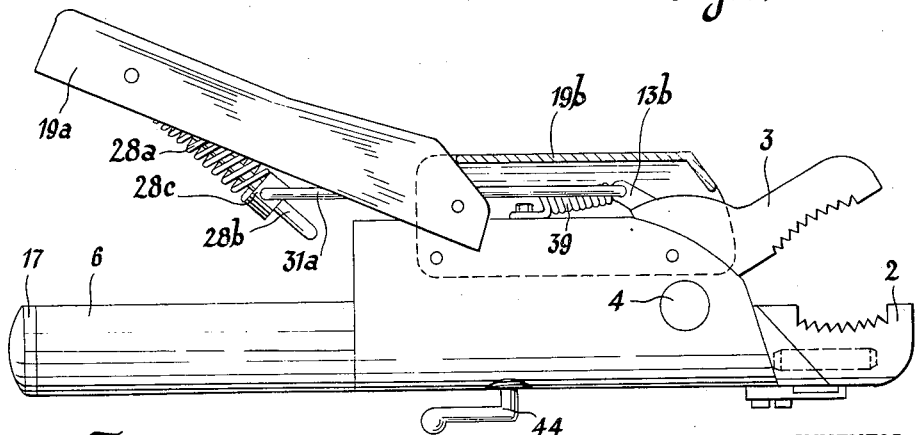
FIG. 12 is a corresponding plan view, partly broken open.

FIGS. 11 and 12 show another embodiment of the invention designed as a pipe wrench whose jaws, 2, 3 have concave serrated operating faces.

In this tool the hydraulic system and the link connection between the handle and movable jaw are in principle similar to those of the tool shown in FIGS. 1 to 8, but the tool as a whole is even more compendious. The link connection between the handle 19a and the movable jaw 3 includes a rod 31a, linked to the lugs 13b of the movable jaw, a helical compression spring 28a whose one end is fixed to a block 28c linked to rod 31a, and a rod 28b slidable within the spring and through the block 28c and hinged to a pin 19c fixed to the handle 19a, all this in analogy to the link connection between the handle and movable jaw in the embodiment according to FIGS. 1 to 8. This link system lies snugly within the handle 19a. The latter covers only the rear part of the frame 1 from which it projects rearwards, while the main part of the frame is covered by a fixed cover 19b.

The release valve is in this case a needle valve 42 made integral with a threaded section 43 of a handle 44, which is screwed into the body 1. By turning the handle 44 through a given angle, the needle valve is either closed or opened, as the case may be.

In addition to the parts of the hydraulic system illustrated in connection with the first embodiment, the tool shown in FIGS. 11 and 12 has an overload relief valve constituted by a spring-loaded ball valve 45 which is disposed in a duct 46 between the main discharge duct 14 of the tank 6 and the duct 14a between the pump cylinder 8 and the suction chamber 9. The width of the duct 46 as well as the strength of the spring acting on the valve 45 are so dimensioned that this valve opens only at a predetermined pressure above the working pressure for which the tool is designed.

FIGS. 13 to 15 illustrate a tool according to the invention designed as a spreading tool, e.g. for widening the end of a pipe. FIGS. 13 and 14 are sections in the median longitudinal plane of symmetry of the tool but the movable jaw 3a is shown in non-sectional elevation. The movable jaw 3a registers with the fixed jaw 2c in the inoperative position and moves away from the latter in the operation of the tool. The hydraulic piston 11 presses against the nose 13a of the movable jaw 3a against the action of a compression spring 39a which takes the place of the tension spring 39 of the first embodiment. For the rest, the design of the tool may be the same as described above for the first and second embodiments of the invention. FIG. 13 also shows some more modifications of the general design of the tool which are applicable not only to the particular case in which the tool is designed as a spreader but to all other uses as well, e.g. as a cutter or wrench. In this design, the object of which is to reduce even further the size of the tool, the tank 6, delivery duct 14, suction chamber 9, delivery chamber 10 and cylinder 12 are coaxially aligned, and the pump cylinder 8 opens directly into the suction chamber 9. A return duct 46 connects the delivery chamber 10 with the duct 14 upstream of the suction chamber through a cone valve 47 which is a combined pressure release and overload relief valve and has a seat 48 in the passage between ducts 46 and 14. The cone 47 is secured into a piston 52 which is reciprocable in a cylinder 51 and urged by a compression spring 53 into the position in which the valve is pressed on seat 48. The piston 52 is engaged by an actuating handle 54 pivoted at 55 in the body 1. Downward pressure exerted on the handle 54 lifts the valve 47 from its seat. This is normally done at the end of the operation of the tool for the release of the pressure, as the return duct 46 is thereby opened. In a case of overload the pressure of the liquid in duct 46 lifts the valve 47 from its seat against the action of spring 53 which has accordingly to be so dimensioned that this spontaneous action is produced only when an overload of predetermined magnitude occurs. The valve handle 54 will have to stay clear of the tool handle 19c by such a distance that the handle 19c can be pressed down without touching the handle 54.

FIG. 15 is self-explanatory in showing a fragmentary exploded view of the movable jaw 3a, fixed jaws 2c and axle 4.

FIGS. 16 to 18 show the bit portion of a tool which, for the rest, is the same as the tool according to FIG. 13. The movable jaw 3b as well as the fixed jaw 2d have serrated cooperating pincing surfaces 3c, 2e, respectively.

In this tool the movable jaw 3b closes in on the fixed jaw 2d when the hydraulic system is actuated.

This application is a continuation of my prior application Serial No. 854,487, filed November 20, 1959.

I claim:

1. A one-hand hydraulic tool comprising a frame and a stationary jaw fixed thereto; a movable jaw pivotally mounted in the frame for movement towards and away from the stationary jaw and including a cam member; a hydraulic power system disposed in the frame and including a liquid tank, a piston reciprocable in a cylinder and adapted to be pressed unconnectedly against the cam member of the movable jaw, thereby to impart a moment to the movable jaw, a pump connected to the tank by a suction duct and to the cylinder by a delivery duct, check valves in the suction and delivery ducts, a return duct from the cylinder to the tank, and a pressure release valve in the return duct; a handle connected to the frame member for the operation of the pump; springy means acting on the movable jaw in opposition to the moment imparted to the movable jaw by the pressure exerted on said cam member by the hydraulic piston; and non-hydraulic means for mechanically imparting to the movable jaw a moment co-directional with the moment imparted to the movable jaw by said piston.

2. A one-hand hydraulic tool comprising a frame and a stationary jaw fixed thereto; a movable jaw pivotally mounted in the frame for movement towards and away from the stationary jaw and including a cam member; a hydraulic power system disposed in the frame and including a liquid tank, a piston reciprocable in a cylinder and adapted to be pressed unconnectedly against the cam member of the movable jaw, thereby to impart a moment to the movable jaw, a pump connected to the tank by a suction duct and to the cylinder by a delivery duct, check valves in the suction and delivery ducts, a return duct from the cylinder to the tank, and a pressure release valve in the return duct; a handle connected to the frame member for the operation of the pump; springy means acting on the movable jaw in opposition to the moment imparted to the movable jaw by the pressure exerted on said cam member by the hydraulic piston; and links, including a helical compression spring and a rod slidable within the spring, connected to the handle and the movable jaw, respectively, and adapted to impart to the movable jaw a moment co-directional with the moment imparted to the movable jaw by said piston.

3. A one-hand hydraulic tool according to claim 1, wherein the piston is adapted to impart to the movable jaw a moment in a direction towards the stationary jaw.

4. A one-hand hydraulic tool according to claim 1, comprising a set of links hinged at one end to the handle and at the other end to the movable jaw and including a compression spring, and adapted to impart to the movable jaw a moment in the direction towards the stationary jaw.

5. A one-hand hydraulic tool according to claim 1, comprising means for detachably mounting the movable jaw in the frame.

6. A tool according to claim 1, wherein the hydraulic system includes an overload relief valve.

7. A one-hand hydraulic tool comprising a frame and a stationary jaw fixed thereto; a movable jaw pivotally mounted in the frame for movement towards and away from the stationary jaw and including a cam member; a hydraulic power system disposed in the frame and including a liquid tank, a piston reciprocable in a cylinder and adapted to be hydraulically pressed unconnectedly against the cam member of the movable jaw, thereby to impart a moment to the movable jaw, first spring means for continuously biasing the piston against the cam member, a pump connected to the tank by a suction duct and to the cylinder by a delivery duct, check valves in the suction and delivery ducts, a return duct from the cylinder to the tank, and a pressure release valve in the return duct; a handle connected to the frame member for the operation of the pump; and second spring means acting on the movable jaw in opposition to the moment imparted to the movable jaw by the pressure exerted on said cam member by the hydraulic piston.

8. A one-hand hydraulic tool according to claim 7 comprising means for detachably mounting the movable jaw in the frame.

9. A tool according to claim 7 wherein the hydraulic system includes an overload relief valve.

10. A one-hand hydraulic tool according to claim 7 wherein the piston is adapted to impart to the movable jaw a moment in a direction away from the stationary jaw.

No references cited.